United States Patent [19]

Hayashi et al.

[11] Patent Number: 5,274,322
[45] Date of Patent: Dec. 28, 1993

[54] ALTERNATING CURRENT GENERATOR FOR VEHICLE

[75] Inventors: Seiji Hayashi, Anjo; Masato Hanai, Aichi; Toshiaki Hotta, Chiryu; Keiichiro Banzai, Toyota, all of Japan

[73] Assignee: Nippondenso Co., Ltd., Kariya, Japan

[21] Appl. No.: 710,045

[22] Filed: Jun. 4, 1991

[30] Foreign Application Priority Data

Jun. 7, 1990 [JP] Japan .................. 2-149165

[51] Int. Cl.$^5$ .............................. H02K 11/00
[52] U.S. Cl. ................................ 322/90; 322/58; 318/771; 310/198
[58] Field of Search ............. 322/90, 65, 58, 20, 322/62, 46, 89, 51, 52; 310/198, 264, 269, 261, 68 R; 318/771

[56] References Cited

U.S. PATENT DOCUMENTS

| | | | |
|---|---|---|---|
| 4,163,187 | 7/1979 | Thomas | 322/90 X |
| 4,307,311 | 12/1981 | Grozinger | 310/179 |
| 4,338,534 | 7/1982 | Broadway et al. | 310/198 X |
| 4,710,661 | 12/1987 | Gjota | 310/198 |
| 4,739,466 | 4/1988 | Glennon et al. | 363/89 |

FOREIGN PATENT DOCUMENTS 59-179500 11/1984 Japan .
60-204240 10/1985 Japan .
62-145471 9/1987 Japan .
63-17562 2/1988 Japan .

Primary Examiner—Steven L. Stephan
Assistant Examiner—E. To
Attorney, Agent, or Firm—Cushman, Darby & Cushman

[57] ABSTRACT

In the alternating current generator for vehicle, an armature coil comprises a Y-connected first three-phase armature coil and a delta-connected second three-phase armature coil whose phase windings are inserted into same slots respectively. Each of the three-phase armature windings is provided with rectifying means for converting respective a.c. output into a direct current. The direct currents are summed to provide an output of the generator. It is effective to use a plurality of rotary magnet poles provided on a shaft of the generator for a compact a.c. generator in which the radial dimension of the rotary magnet poles is reduced.

11 Claims, 4 Drawing Sheets

ALTERNATING CURRENT GENERATOR FOR VEHICLE

BACKGROUND OF THE INVENTION

The present invention relates to an alternating current generator for a vehicle and in particular to an alternating current generator in which the ripple component of an output current is reduced.

Recently, the electrical load of a vehicle has been increasing. A high quality power source having less noise or fluctuations such as ripple has been demanded.

Japanese Unexamined Utility Model publication No. Sho 63-17562 discloses a generator in which two Y-connected three-phase armature coils of a prior art welding inductor type generator are disposed on an armature core of the generator, a first one of the coils being angularly shifted by 150 degrees in electrical angle from a second, other, one of the coils. Each three-phase armature coil is connected with respective full-wave rectifiers. The respective rectifiers are connected in parallel with each other.

Two three-phase alternating currents generated by the three-phase armature coils of the above mentioned structure having the 150 degree phase difference in electrical angle are converted into direct currents by the respective full-wave rectifiers. These two direct currents are summed to provide an output current of the generator. In the structure, the ripple of the output is reduced by providing the 150 degree phase difference.

However, it is necessary to provide other slots which are angularly shifted by a given mechanical angle corresponding to 150° in electrical angle to insert therein the first three-phase armature coil in addition to slots into which the second three-phase armature coil is inserted. Accordingly, the number of the slots is double as much as that of usual generators.

Making the number of the slots double in such a manner invites disadvantages of difficulties in inserting the coils due to a decrease in rigidity of the armature core and a decrease in the cross section of the slots. Thus there arises also a problem that design of the armature core, particularly for a compact generator, can not be physically performed.

SUMMARY OF THE INVENTION

It is an object of the present invention to provide an alternating current generator (alternator) for a vehicle in which the ripple of the d.c. output is reduced without increasing the number of slots.

In the alternating current generator for a vehicle of the present invention, an armature coil assembly comprises a Y-connected first three-phase armature coil and a delta-connected second three-phase armature coil, which are inserted into the same slots.

Each of the three-phase armature coils is provided with rectifying means for converting respective a.c. output into a direct current. The direct currents are summed to provide an output current of the generator.

It can be effectively applied to a compact a.c. generator having rotary magnet poles reduced their radial size and juxtaposed on and along the generator shaft.

The line voltage, i.e., output voltage of the first three-phase armature coil is $\sqrt{3}$ times as high as the phase voltage while the line voltage of the second three-phase armature coil is equal to the phase voltage. It may be considered that the ratio of the number of turns of the second three-phase armature coil to that of the first three-phase armature coil be $1:\sqrt{3}$ in order to theoretically make the respective line voltages equal. Since the current flowing through the second three-phase armature coil has a tendency to become higher than the current flowing through said first three-phase armature coil, it is better to make the number of turns of the coil larger than $\sqrt{3}$.

When the respective coil-phase windings of the Y-connected first three-phase armature coil and the delta-connected second three-phase armature coil are wound in the same slots, the a.c. outputs generated at the first and second coils have a 30 degree phase difference. By utilizing this fact, the d.c. outputs of first and second rectifying means for converting these alternating current outputs into independent d.c. outputs are 30 degree out-of-phase with each other.

In other words, the timing of a minimum value of the output of the first rectifying means corresponds to that of a maximum value of the output of the second rectifying means. On the other hand the timing of a maximum value of the output of the first rectifying means corresponds to that of a minimum value of the output of the second rectifying means. Therefore, the difference between a minimum value and a maximum value of the summed output waveform is smaller than the differences between the maximum value and the minimum value of the respective output of the first and second rectifying means.

By the feature of inserting the respective phase windings of the Y-connected first three-phase armature coil and the delta-connected second three-phase armature coil in the same respective slots in a compact generator in which the radial size of the rotary magnet poles is reduced and disposed in juxtaposed relation on and along its shaft to respondingly decrease the radial dimension of the armature core, the present invention can be advantageously applied to physically or mechanically compact armature cores.

By making higher than the ratio of $\sqrt{3}$ the ratio of the number of turns of the second three-phase armature coil to that of the first three-phase armature coil, the resistance value of the second three-phase armature coil is increased at a high speed rotation of the generator.

Since the ripple of the d.c. output of the generator can be reduced by inserting the two three-phase armature coils in the same slots in the present invention as mentioned above, it is not necessary to increase the number of slots.

Since the ripple of the d.c. output can be reduced without increasing the number of slots, that is, without increasing the radial dimension of the armature core as mentioned above, the present invention can be applied to compact a.c. generators in which the radial dimension thereof is reduced by disposing a plurality of rotary magnetic poles on the shaft so that they are juxtaposed with each other therealong.

There is an excellent advantage that the ripple of the d.c. output can be stably reduced while the resistance due to the inductance of the second three-phase armature coil is increased so that the current flowing therethrough will not become larger than the current of the first three-phase armature coil by making the number of turns of the second three-phase armature coil than a theoretical value.

DESCRIPTION OF THE PREFERRED EMBODIMENTS

Figure 1:
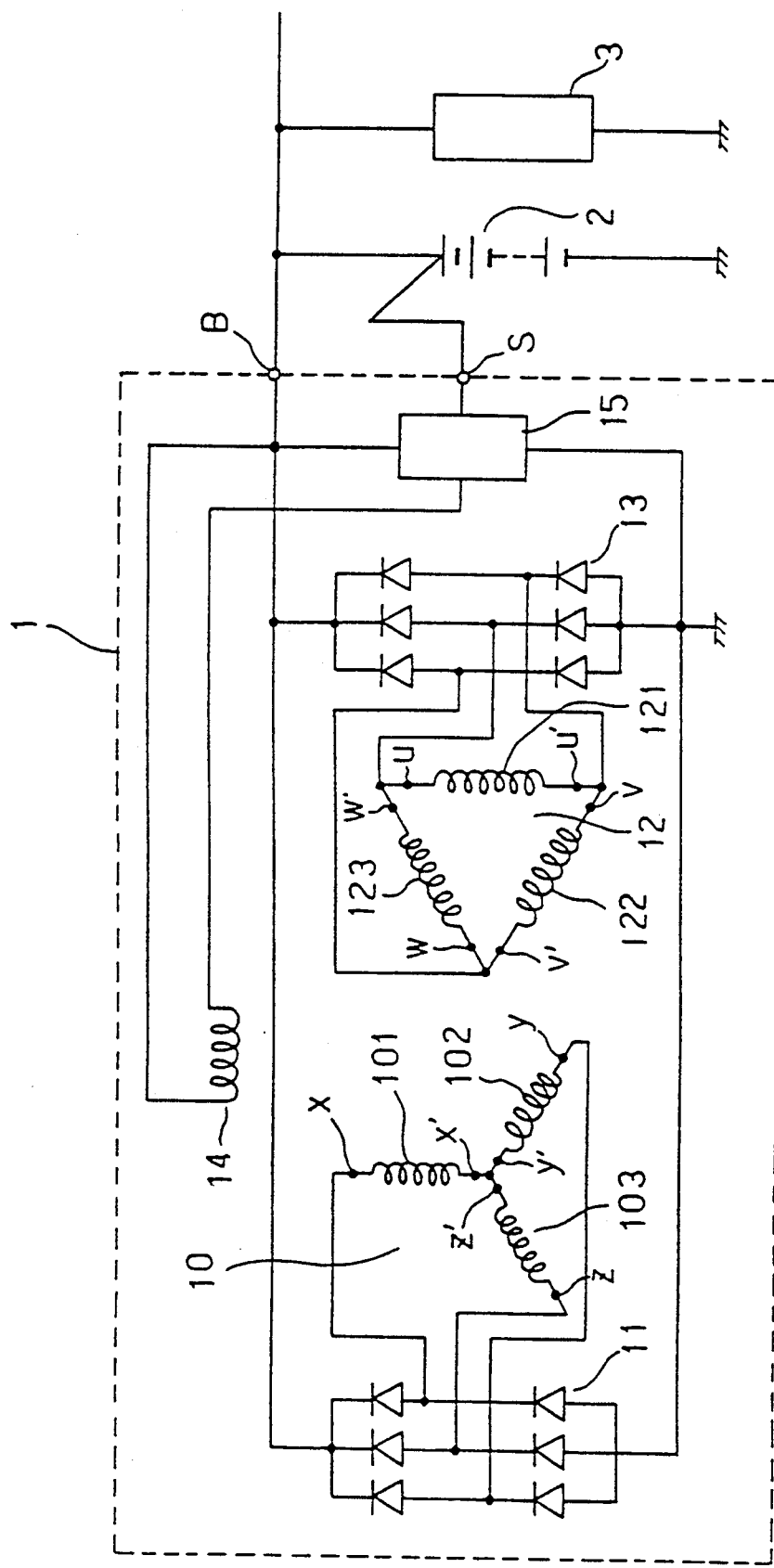
FIG. 1 is an electrical circuit diagram showing an embodiment of an alternative current generator of the present invention.

Referring now to FIG. 1, an a.c. generator for a vehicle 1 is adapted to supply a battery 2 and an electric load 3 with a current.

A Y-connected first three-phase armature coil 10 comprises windings 101, 102 and 103, one for each phase, which are connected with each other at their ends x', y' and z' and with a full wave rectifier 11 which forms a first rectifying means at their opposite ends x, y and z.

A delta-connected second armature coil 12 comprises windings 121, 122 and 123, one for each phase, having ends u and w, v and u', w and v' which are connected with each other on different three connecting positions and are connected with a full-wave rectifier forming a second rectifying means.

Figure 6:
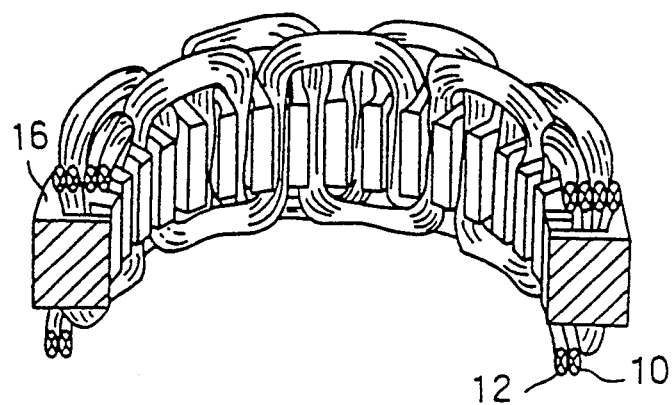
FIG. 6 is a perspective view showing the essential components of the armature.
Figure 7:
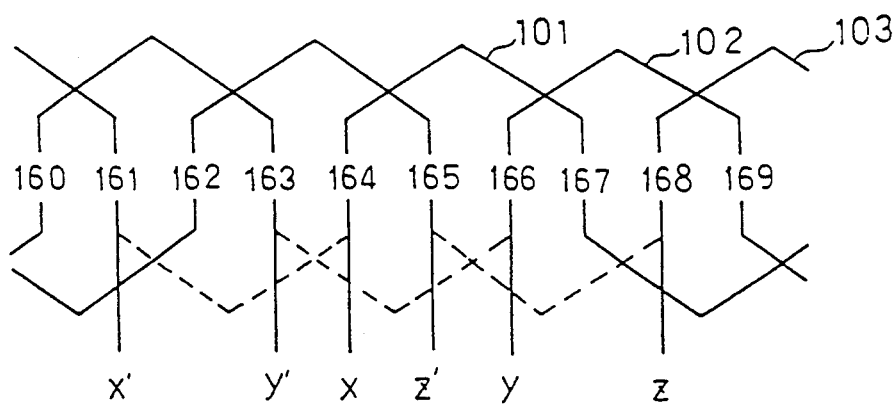
FIG. 7 is a schematic diagram showing the way of winding of the first three-phase winding.
Figure 8:
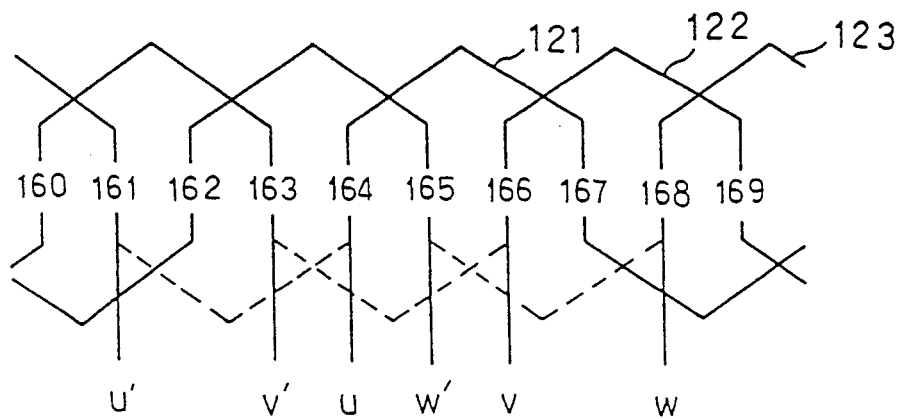
FIG. 8 is a schematic diagram showing the winding way of the second three-phase winding.

Each pair of the windings 101 and 121; 102 and 122; and 103 and 123 of each phase of the first and second armature coils 10 and 12 are inserted in the same slot of an armature core 16, as shown in FIG. 6. The winding manners of the first and second three-phase armature coils 10 and 12 are identical with each other. The manner of winding will be described by way of the winding 101. As schematically shown in FIG. 7, the winding 101 extends from one end x and successively passes through slots 164, 167, . . . , 161 and reaches the other end x'. The winding 101 is wave-wound in such a manner. The winding 102 starts from a slot 166 which is delayed by 120° in electrical angle phase with respect to the winding 101. The winding 103 starts from a slot 168 which is delayed by 240° in electrical angle phase. The windings 102 and 103 are wave-wound.

One end x, y and z of each winding may be lead out from the armature on desired position and is lead out depending upon the mounting position of the first and second full-wave rectifiers.

Figure 2:
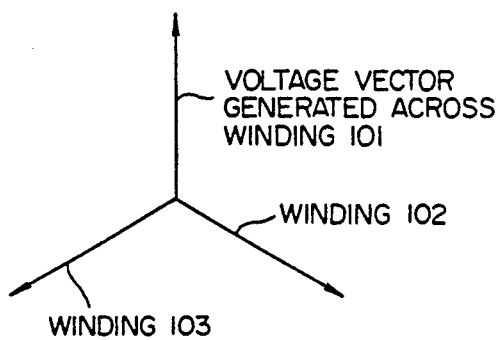
FIG. 2 is a vector diagram showing the voltage generated at respective phase winding of a Y-connected first three-phase armature coil.
Figure 3:
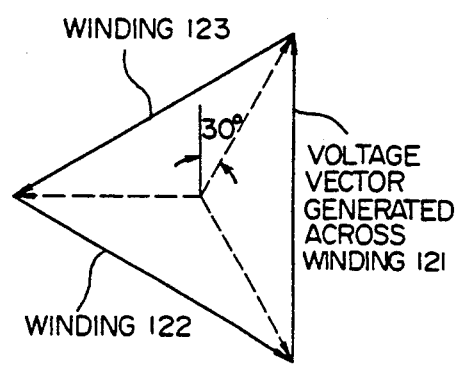
FIG. 3 is a vector diagram showing voltages generated at respective phase windings of the delta-connected second three-phase armature coil.
Figure 4:
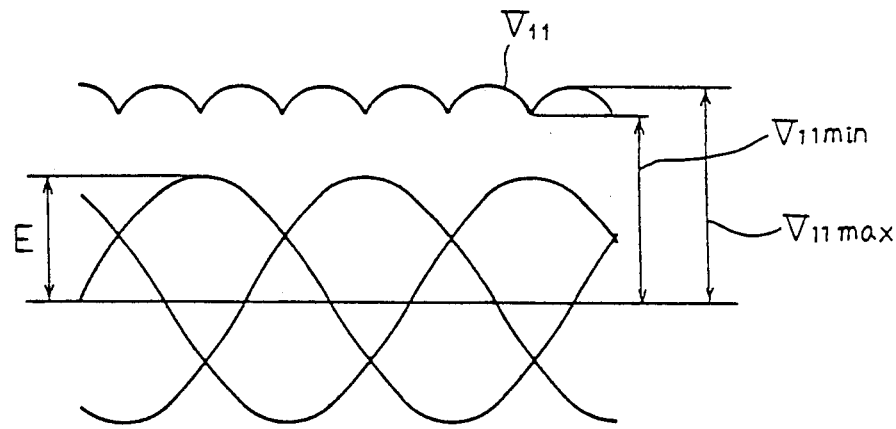
FIG. 4 is a waveform view showing voltage generated at respective phase windings of the Y-connected first three-phase armature coil and an output voltage $V_{11}$ of a first rectifier.

Voltage vectors generated across three-phase armature coils 10 and 12 in the above-mentioned structure are shown in FIGS. 2 and 3, respectively.

In FIG. 3, vectors of the voltages obtained across the delta connected winding, which is transformed into the vectors obtained in the Y-connected winding are represented by dotted lines.

Comparing of the vectors of FIG. 2 with those of FIG. 3 shows that there is a phase difference of 30° between them.

Since the line voltage generated in the delta-connected second three-phase armature coil 12 is equal to the phase voltage and the line voltage generated in the Y-connected first three-phase armature coil 10 is $\sqrt{3}$ times higher than the phase voltage in amplitude as is well-known, the ratio of the number of turns of the Y-connected winding of each phase to the number of turns of the delta-connected winding of each phase is made $1:\sqrt{3}$ in order that the line voltages generated in the first and second three-phase armature coils 10 and 12, respectively are equal with each other.

By inserting the first and second three-phase armature coils 10 and 12, in the same slots, the line voltage of the second armature coils having the same amplitude as and a phase which is 30° out-of-phase from that of the first armature coil 10 is generated.

An a.c. output generated across the first three-phase armature coil 10 is converted into a d.c. output by the first full-wave rectifier 11 and an a.c. output generated across the second three-phase winding is converted into a d.c. output by a second full wave rectifier 13. The first and second full wave rectifiers 11 and 13 are connected with each other in parallel. The respective d.c. outputs are added to provide an output voltage of a generator 1 (a voltage $V_B$ at point B).

A voltage regulator 15 is adapted to control the battery 2 to provide a constant voltage by energizing the field winding 14 to enable the generator 1 to generate an electric power when the voltage of the battery 2 is not higher than a given value and by deenergizing the field winding 14 to disable the generator 1 to generate the electric power.

The waveforms of the output voltages of the generator 1 will now be described.

The waveforms of the output of each phase of the generator 1 are sinusoidal and 120° out-of-phase with each other. The waveform of the output of the first full-wave rectifier 11 is a direct current represented at $V_{11}$ in the drawing. The ripple voltage in the d.c. output $V_{11}$ is represented as $V_{11max} - V_{11min}$. If the maximum value of these sinusoidal waves generated as E and the forward voltage drop across the diode is assumed as 0 volt, the ripple is represented as follows:

$$V_{11max} - V_{11min} = E\{\sin(\pi/3) - \sin(-\pi/3)\} - E\{\sin(\pi/3 + \pi/6) - \sin(-\pi/3 + \pi/6)\}$$

$$= E(\sqrt{3} - 3/2) \approx 0.232E$$

The average value $\bar{V}_{11}$ of $V_{11}$ is represented as follows:

$$\overline{V_{11}} = \frac{1}{\pi/6} \int_0^{\frac{\pi}{6}} [E\{\sin(\theta + \pi/3) - \sin(\theta - \pi/3)\}]d\theta$$
$$\approx 1.654E$$

If the ripple factor is represented as $(V_{11max} - V_{11min})/\overline{V_{11}}$, it is 0.14.

On the other hand, the output waveform of the delta-connected second armature coil 12 is a sinusoidal wave having the same amplitude as and 30° out-of-phase of those of the output waveform of the above-mentioned Y-connected first three-phase armature coil 10. Accordingly, the output waveforms of the first and second full-wave rectifiers 11 and 13 are the same in amplitude and 30 degrees out-of-phase.

Figure 5:
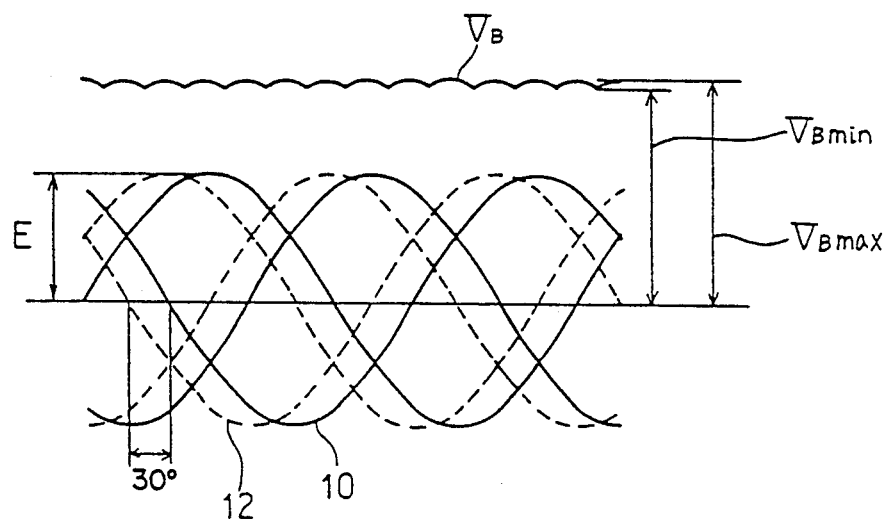
FIG. 5 is a waveform view showing voltages generated at respective phase windings of the Y-connected first three-phase armature coil, voltages generated at respective phase windings of the delta-connected second three-phase armature coil, and a voltage VB which is obtained by adding the output voltages of the first and second rectifiers.

The waveform of the d.c. summed output of the first and second full-wave rectifiers 11 and 13, that is, the output voltage $V_B$ of the generator 1 is shown in FIG. 5.

The ripple of the output voltage is represented as $V_{Bmax} - V_{Bmin}$. If the maximum value of the sinusoidal wave generated by the generator 1 is represented as E and the forward voltage drop across the diode is assumed as 0 volts is similar to the foregoing, the ripple is represented as follows;

$$V_{Bmax} - V_{Bmin} = E\{\sin(\pi/3) - \sin(-\pi/3)\} - E\{\sin(\pi/3 + \pi/12) - \sin(-\pi/3 + \pi/12)\}$$
$$\approx 0.059E$$

The average value $\overline{V_B}$ of $V_B$ is represented as follows:

$$\overline{V_B} = \frac{1}{\pi/12} \int_0^{\frac{\pi}{12}} [E\{\sin(\theta + \pi/3) - \sin(\theta - \pi/3)\}]d\theta$$
$$\approx 1.712E$$

The ripple factor $(V_{Bmax} - V_{Bmin})/\overline{V_B} = 0.034$.

Accordingly, the ripple factor is reduced to 0.034 by summing the d.c. outputs of the first and second full-wave rectifiers 11 and 13 although the ripple factor of only d.c. output of the first full-wave rectifier 11 is 0.14.

Since the ripple of the d.c. output of the generator 1 can be reduced by inserting the Y-connected first three-phase armature coil 10 and the delta-connected second three-phase armature coil 12 in the same slots of the armature core 16 in the above mentioned embodiment, it is not necessary to increase the number of the slots as is done in the prior art.

Figure 10:
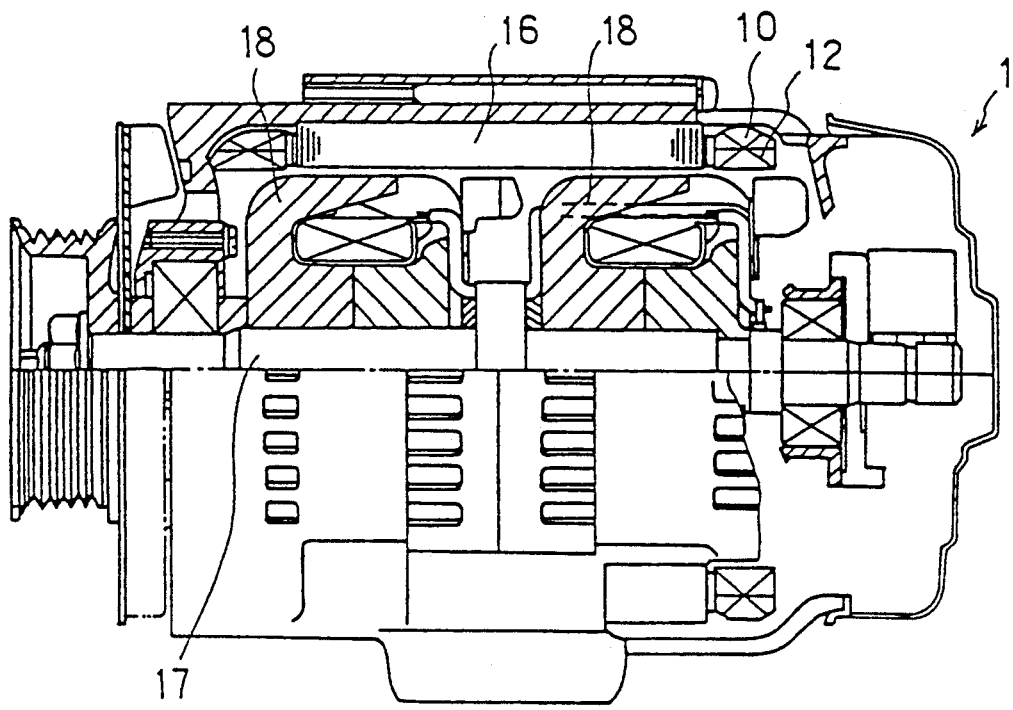
FIG. 10 is a partial sectional front view showing a tandem generator.

Two pairs of cylindrical rotary magnetic poles on which the magnetic field windings 14 are wound can be used for the generator 1 provided on a shaft 17 as shown in FIG. 10. The radial dimension of the rotary magnet poles 18 of the generator 1 as shown in FIG. 10 (hereinafter referred to as tandem generator) can be reduced with respect to the generator having one pair of rotary magnetic poles by disposing two pairs of rotary magnetic poles 18 on the shaft 17 in a juxtapositional relationship in an axial direction in case where the same output as that of the generator having one pair of magnetic poles 18 is obtained. The radial dimension of the armature core 16 and the generator 1 can be correspondingly reduced. Although a decrease in the radial dimension of the rotary magnetic poles 18 makes it possible to achieve high speed rotation, the ripple of the d.c. output increases at high speed rotation.

Accordingly, it is difficult to provide another slot on a position which is shifted by 150° degrees in electrical angle with respect to the Y-connected three-phase armature coil which is inserted into the slot of the armature core as is conventionally done and to insert another Y-connected three-phase armature coil in order to reduce the ripple of the d.c. output. It becomes impossible to physically design the armature core 16 in particular for the small size generator. If the strength of the armature core 16 and the sectional area of the slot and other factors are considered to practically adopt this structure for the tandem generator, it is necessary to increase the radial dimension of the armature core 16. Therefore, an advantage of the tandem generator will be lost.

In contrast to this, since the Y-connected first three-phase armature coil 10 and the delta-connected second three-phase armature coil 12 can be inserted in the same slot of the armature core, it is not necessary to change the number of slots and the ripple of the d.c. output can be reduced without enlarging the radial dimension of the armature core 16.

Therefore, the ripple of the d.c. output can be reduced without losing the advantages of the tandem generator.

At a high speed rotation of the generator, the current flowing through the delta-connected second three-phase armature coil 12 has a tendency to increase relative to the current flowing through the Y-connected first three-phase armature coil 10. In this case, the ripple amplitude is higher than that at a low speed rotation. In order to cope with this, it will suffice to increase the number of turns of each of windings 121, 122 and 123 of the second three-phase armature coil 12 than $\sqrt{3}$ times as much as that of each of windings 101, 102 and 103 of the first three-phase armature coil 10.

Figure 9:
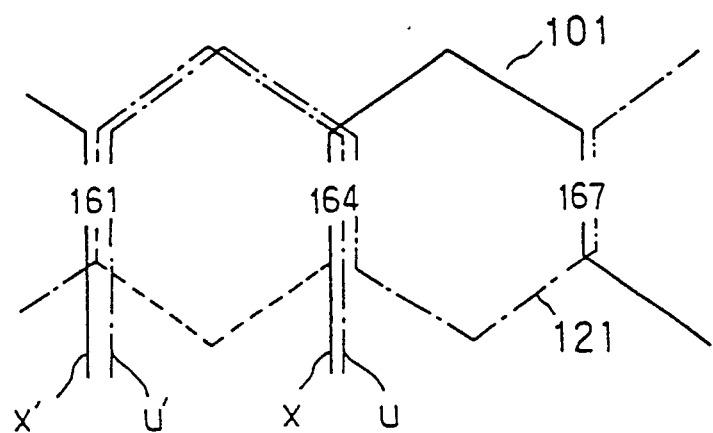
FIG. 9 is a schematic diagram showing the other winding way of the first and second three-phase winding.

This increases the winding resistance due to inductance of each of the windings 121, 122 and 123 of the second three-phase armature coils 12 at a high speed rotation of the generator to hinder the current so that the increase in the ripple amplitude can be prevented. Overlap portions of the windings themselves inserted in the same slots (101 and 121 in the drawings) outside of the slots is eliminated by winding the first and second three-phase armature coils 10 and 12 in a slot in opposite directions as shown in FIG. 9 in the above-mentioned embodiment. Since the windings are not densely wound, cooling is facilitated.

The present invention can be used for a compact alternator since the delta- and Y-connected windings are inserted into the same slot (the number of slots is not increased) in the present embodiment.

Since the ripple is increased in a high output alternator, it is necessary to suppress the ripple in this structure. This structure is effective for the compact alternator.

As an modification of the above mentioned embodiment, the rotor may be formed of a permanent magnet to provide a high output.

It will suffice to separately provide the lead out portions of the delta- and Y-connected windings to facilitate winding since the wire diameter and the number of turns of the delta-connected winding are different from those of the Y-connected winding.

We claim:

1. An alternating current generator for a vehicle comprising:

an armature including an armature core having a plurality of slots, a Y-connected first three-phase armature winding wound in said slots and a delta-connected second three-phase armature core as said Y-connected first three-phase armature winding:

a rotary magnetic pole for generating an alternating current output in said Y-connected first three-phase armature winding and said delta-connected second three-phase armature winding by supplying said armature core with a magnetic flux; and rectifying means for converting alternating outputs generated by said Y-connected first three-phase armature winding and said delta-connected second three-phase armature winding into a direct current output.

2. A generator according to claim 1, characterized in that a ratio of the number of turns of said Y-connected first three-phase armature winding to that of said delta-connected second three-phase armature winding is substantially $\sqrt{3}$.

3. The generator according to claim 1, wherein the rectifying means combines the converted alternating outputs generated by said Y-connected first three-phase armature winding and said delta-connected second three-phase armature winding to supply a direct current output with reduced ripple.

4. A generator according to claim 1, characterized in that said rotary magnetic pole comprises a plurality of cylindrical magnetic poles which are juxtaposed with each other in an axial direction of the rotary pole.

5. A generator according to claim 4, characterized in that a ratio of the number of turns of said first three-phase armature winding to that of said second three-phase armature winding is substantially $\sqrt{3}$.

6. A generator according to claim 5, characterized that a ratio of the number of turns of said Y-connected first three-phase armature winding to that of said delta-connected second three-phase armature winding is substantially $\sqrt{3}$.

7. An alternating current generator for a vehicle comprising:

an armature including an armature core having a plurality of slots, a Y-connected first three-phase armature winding and a delta-connected second three-phase armature winding, both of which are inserted in the same slots of said plurality of slots of said armature core;

a rotary magnetic pole for generating an alternating current output in said Y-connected first three-phase armature winding and said delta-connected second three-phase armature winding by supplying said armature core with a magnetic flux;

a first rectifying means connected with said Y-connected first three-phase armature winding for converting alternating current outputs generated by said Y-connected first three-phase armature windings into a first direct current output;

a second rectifying means having an output connected in parallel with said first direct current output and having an input connected with said delta-connected three-phase armature winding for converting an alternating current output generated by said delta-connected second three-phase armature winding into a second direct current output, wherein said direct current output from the said first rectifying means is summed with said direct current output from said second rectifying means to provide a summed output.

8. A generator according to claim 7, characterized in that said rotary magnetic pole comprises a plurality of cylindrical magnetic poles which are juxtaposed with each other in an axial direction of the rotary pole.

9. The generator according to claim 7, further comprising combination means for summing said direct current output from said first rectifying means with said direct current output from said second rectifying means to supply a direct current with reduced ripple.

10. A generator according to claim 7, characterized in that a ratio of the number of turns of said first three-phase armature winding to that of said second three-phase armature winding is substantially $\sqrt{3}$.

11. A generator according to claim 10, characterized that a ratio of the number of turns of said Y-connected first three-phase armature winding to that of said delta-connected second three-phase armature winding is substantially $\sqrt{3}$.

* * * * *

UNITED STATES PATENT AND TRADEMARK OFFICE
CERTIFICATE OF CORRECTION

PATENT NO.    :    5,274,322

DATED         :    DECEMBER 28, 1993

INVENTOR(S)   :    HAYASHI ET AL

It is certified that error appears in the above-identified patent and that said Letters Patent is hereby corrected as shown below:

In Column 7, Claim 1 lines 6 to 7  insert after "armature"

--winding also wound in the same slots of the armature--

Signed and Sealed this

Twenty-third Day of May, 1995

Attest:

BRUCE LEHMAN

*Attesting Officer*     Commissioner of Patents and Trademarks